United States Patent
Laffont et al.

(10) Patent No.: US 11,733,450 B2
(45) Date of Patent: Aug. 22, 2023

(54) BRAGG GRATING OPTICAL FIBER SENSOR ASSOCIATED WITH A SCATTERING STRUCTURE AND METHODS FOR LOCATING AND INSTALLING SUCH A SENSOR

(71) Applicants: COMMISSARIAT A L'ENERGIE ATOMIQUE ET AUX ENERGIES ALTERNATIVES, Paris (FR); SAFRAN, Paris (FR)

(72) Inventors: Guillaume Laffont, Meudon (FR); Romain Cotillard, Bazoches sur Guyonne (FR); Nicolas Roussel, Paris (FR)

(73) Assignees: COMMISSARIAT A L'ENERGIE ATOMIQUE ET AUX ENERGIES ALTERNATIVES, Paris (FR); SAFRAN, Paris (FR)

( * ) Notice: Subject to any disclaimer, the term of this patent is extended or adjusted under 35 U.S.C. 154(b) by 0 days.

(21) Appl. No.: 17/253,983

(22) PCT Filed: Jun. 19, 2019

(86) PCT No.: PCT/FR2019/051504
§ 371 (c)(1),
(2) Date: Dec. 18, 2020

(87) PCT Pub. No.: WO2019/243745
PCT Pub. Date: Dec. 26, 2019

(65) Prior Publication Data
US 2021/0271019 A1    Sep. 2, 2021

(30) Foreign Application Priority Data
Jun. 21, 2018  (FR) ...................................... 1855475

(51) Int. Cl.
*G02B 6/02*     (2006.01)
*G01J 5/00*     (2022.01)
(Continued)

(52) U.S. Cl.
CPC ............ *G02B 6/02309* (2013.01); *G01J 5/00* (2013.01); *G01K 11/3206* (2013.01);
(Continued)

(58) Field of Classification Search
None
See application file for complete search history.

(56) References Cited

U.S. PATENT DOCUMENTS 5,633,748 A    5/1997  Perez et al.
6,408,118 B1   6/2002  Ahuja et al.
(Continued)

FOREIGN PATENT DOCUMENTS

CN          107991734 A         5/2018
DE     102014211918 A1  *  12/2015    ......... G01D 5/35316
(Continued)

OTHER PUBLICATIONS

International Search Report dated Sep. 5, 2019 in PCT/FR2019/051504 (submitting English translation only), 3 pages.
(Continued)

*Primary Examiner* — Chad H Smith
(74) *Attorney, Agent, or Firm* — Oblon, McClelland, Maier & Neustadt, L.L.P.

(57) ABSTRACT

The field of integrated health monitoring using Bragg grating optical fibre sensors including a sensor and methods for locating and installing this sensor on a support. The Bragg grating optical fibre sensor includes an optical fibre wherein at least one set of patterns forming a Bragg grating is written, the optical fibre further including a set of microstructures in the vicinity of each Bragg grating, the microstructures being
(Continued)

separate from the patterns forming the Bragg grating, each microstructure being capable of scattering a portion of a light beam within a predetermined range of scattering wavelengths.

16 Claims, 3 Drawing Sheets

(51) Int. Cl.
    *G01K 11/3206* (2021.01)
    *G01L 1/24* (2006.01)

(52) U.S. Cl.
    CPC .......... *G01L 1/246* (2013.01); *G02B 6/02123* (2013.01); *G01J 2005/0077* (2013.01)

(56) References Cited

U.S. PATENT DOCUMENTS

| | | |
|---|---|---|
| 2004/0130761 A1 | 7/2004 | Moon et al. |
| 2015/0140556 A1 | 5/2015 | Albert et al. |

FOREIGN PATENT DOCUMENTS

| | | | |
|---|---|---|---|
| JP | 8-286058 A | 11/1996 | |
| JP | 2004-170336 A | 6/2004 | |
| WO | WO-2016167851 A2 * | 10/2016 | ............ A61H 3/00 |

OTHER PUBLICATIONS

Nicolas Roussel, et al., "Measurement of Index Modulation Along Fiber Bragg Gratings by Side Scattering and Local Heating Methods" Optical Fiber Technology, vol. 5, 1999, pp. 119-132.

Mattias L. Aslund, et al., Optical Loss Mechanisms in Femtosecond Laser-Written Point-by-Point Fibre Bragg Gratings, Optics Express, vol. 16, No. 18, Sep. 1, 2008, 7 pages.

Rafael R. Gattass, et al., "Femtosecond Laser Micromachining in Transparent Materials" Nature Photonics, vol. 2, Apr. 2008, pp. 219-225.

Dan Grobnic, et al., Thermally Stable Type II FBGs Written Through Polyimide Coatings of Silica-Based Optical Fiber, IEEE Photonics Technology Letters, vol. 29, No. 21, Nov. 1, 2017, pp. 1780-1783.

U.S. Appl. No. 17/254,080, filed Dec. 18, 2020, Patrick Bulot.
U.S. Appl. No. 11/792,757, filed Jun. 8, 2007, Laffont et al.

* cited by examiner

BRAGG GRATING OPTICAL FIBER SENSOR ASSOCIATED WITH A SCATTERING STRUCTURE AND METHODS FOR LOCATING AND INSTALLING SUCH A SENSOR

TECHNICAL FIELD

The invention relates to the field of structural health monitoring using Bragg grating optical fiber sensors. It relates to such a sensor as well as methods for locating and installing this sensor on a support.

The invention particularly applies to the installation or verification of the positioning of a Bragg grating optical fiber sensor on a surface of a composite material structure, or within this structure.

PRIOR ART

Composite materials are now widely used to replace metallic materials in numerous applications including aeronautics. They offer the advantage of enabling a significant reduction of the weight of the structures while having equivalent mechanical properties. However, the aging of composite materials and the associated variations of the mechanical properties thereof are still poorly known. Thus, in applications requiring a high level of safety, such as aeronautics, the use of these materials is often associated with the integration of various sensors on or in the structure in order to track these variations. The different technologies involving the tracking of the properties of a structure using integrated sensors are referred to as "structural health monitoring". Of the different types of sensors that can be used, Bragg grating optical fiber sensors represent a particularly suitable technology. They make it possible to supply temperature and deformation measurements, both in static or quasi-static mode, and in dynamic mode. It is particularly possible to make vibratory measurements, acceleration measurements, or indeed detect sound waves. All these data are useful for detecting, locating, and characterizing defects of the instrumented structures. Furthermore, the same Bragg grating optical fiber sensor can include several Bragg gratings acting in differentiated wavelength bands and thus supplying as many sensing elements for one and the same optical fiber: this is referred to as spectral Bragg grating multiplexing. The Bragg gratings can also be differentiated in the temporal domain, or both in the frequency domain and the temporal domain: this is referred to as temporal multiplexing, and spectral and temporal multiplexing, respectively.

The Bragg grating optical fiber sensors can be integrated on the surface of the structures or in the material core, for example in the folds of the composite material, during the manufacture thereof. In any case, a precise positioning of the Bragg gratings on given zones of interest is generally required when installing the optical fiber sensors. However, this positioning is rendered difficult by the lack of visibility of the Bragg grating(s) inscribed in the optical fiber. Optical fibers generally have a relatively small diameter, the outer diameter of the protective coating being typically between 150 μm (micrometers) and 250 μm and the core diameter being typically of the order of ten nanometers in the case of so-called single-mode optical fibers or some tens of micrometers in the case of so-called multi-mode optical fibers. The Bragg gratings being inscribed in the core of the optical fibers, they also have very small dimensions, rendering them usually invisible or somewhat invisible. A solution consists of marking the optical fiber at the level of the Bragg gratings to enable indirect location. The marking consists of applying an adhesive tape or a coat of paint around the optical fiber. However, the marks remain difficult to locate in that the external diameter of the fiber is small. Furthermore, the material on the surface of which the sensor is to be installed is generally dark, which makes it even more difficult to view the marks. Finally, this surface marking can disappear under the effect of chemical products, for example by cleaning the surface of the optical fiber with ethanol before bonding it to the surface of a structure.

Moreover, the location of the Bragg gratings can prove to be useful after installing the optical fiber sensors on the instrumented structure. This location makes it possible to check the correct positioning of the measurement points or to locate these measurement points, for example during structure maintenance phases. When the optical fiber is attached to the surface of the structure, locating the Bragg gratings suffers from the same problems as during the installation thereof. Furthermore, the task can be complicated by adding, after installing the Bragg grating sensors, an adhesive film, or a protective coating on the surface of the structure. It is then possible that the Bragg gratings are not at all visually locatable. The same applies when the Bragg grating optical fiber sensors are embedded in the composite material. One solution for locating the Bragg gratings of an optical fiber sensor installed on a structure consists of stressing them locally and individually while injecting a measurement signal into the optical fiber and monitoring the spectral response thereof. In practice, it is possible to sweep the surface of the structure using a point heat source and monitor the spectral response of the Bragg gratings. The positions for which a Bragg wavelength variation is observed correspond to the positions of the Bragg gratings. This approach makes it possible to locate the Bragg gratings on the surface or embedded in the material. However, the sweep can be time-consuming and tedious in the case of extensive surfaces. Furthermore, the heat source must be kept close enough to the surface to ensure a sufficient variation of the response of the Bragg gratings, and far enough to prevent damage of the structure. For non-planar surfaces, specific tools would be required to perform the sweep.

In view of the above, the aim of the invention is that of providing a simple solution for enabling the location of the different Bragg gratings of a Bragg grating optical fiber sensor integrated in a structure, both during the installation of this sensor and after this installation.

DESCRIPTION OF THE INVENTION

For this purpose, the invention is based on the elastic scattering property of microstructures present in an optical fiber. When a light beam has a wavelength of the same order of magnitude as the dimensions of the microstructures, this light beam is scattered by each of these microstructures. A portion of the light beam is thus scattered outside the optical fiber at the level of each microstructure and can be visualized directly or indirectly. The microstructures can correspond to the patterns forming a Bragg grating or be formed specifically in addition to the Bragg gratings.

More specifically, the invention firstly relates to a method for locating a Bragg grating optical fiber sensor on a support, the sensor comprising an optical fiber wherein at least one set of microstructures is inscribed, each microstructure being capable of scattering a portion of a light beam in a predetermined scattering wavelength range. According to the invention, the method comprises a step of injecting, into the optical fiber, a light beam wherein the spectrum includes said predetermined scattering wavelength range such that each microstructure scatters a portion of the light beam.

The invention secondly relates to a method for installing a Bragg grating optical fiber sensor on a support. The method comprises locating the Bragg grating optical fiber sensor according to the method described above and a step of positioning the optical fiber on the support according to the scattered portion of the light beam.

In the present document, the term "support" denotes any mechanical part capable of accommodating on the surface thereof or therein at least one segment of optical fiber of a Bragg grating optical fiber optical sensor. The support can particularly be made of composite material. It forms for example a turbojet nacelle panel or an aircraft fuselage panel.

The term "microstructure" denotes any pattern formed in the optical fiber by a local variation of the optical index. Each microstructure has a shape and dimensions enabling a scattering phenomenon, in particular Mie scattering. It can thus be described using the term "scattering microstructure". Each microstructure typically has dimensions of the same order of magnitude as the wavelength of the light beam injected into the optical fiber. The dimensions of each microstructure are for example between $\Delta/10$ and $10\Delta$, where $\Delta$ denotes the wavelength of the light beam or the central wavelength of the spectrum of the light beam.

According to the invention, each microstructure scatters a portion of the light beam injected into the optical fiber. Scattering implies that a portion of the light beam escapes radially from the optical fiber, enabling the detection thereof with the naked eye or using an instrument. The position of the microstructures along the optical fiber can thus be located by the radiation emitted radially by the optical fiber.

In a specific embodiment, the installation method further includes a step of projecting a luminous target onto the support. The luminous target indicates each location where a Bragg grating is to be positioned on the support. The luminous target is for example formed by projecting a light beam wherein the spectrum includes a range of wavelengths in the visible spectrum. The luminous target comprises for example a set of luminous points.

The microstructures and the spectrum of the light beam can be determined such that the microstructures scatter the light beam in a portion of the visible spectrum. In other words, the microstructures can have dimensions between 380 nm (nanometers) and 780 nm. The position of the microstructures along the optical fiber can then be located with the naked eye.

The microstructures and the spectrum can also be determined according to a range of absorption wavelengths of the material of the support, referred to as "absorption range". In particular, the microstructures and the spectrum can be determined such that the microstructures scatter the light beam in a range of wavelengths enabling the conversion of the electromagnetic energy from the light beam into heat. This embodiment is particularly adapted to locating a Bragg grating optical fiber sensor integrated in the support.

The location or installation method further includes a step of acquiring an image of the support in the infrared spectrum. This step can be carried out using an infrared image sensor, commonly referred to as a "thermal camera". It makes it possible to locate hot spots generated on or in the support by the local scattering of the light beam by means of the microstructures.

According to a first alternative embodiment of the invention, the microstructures of each set are arranged so as form a Bragg grating in the optical fiber. In other words, the microstructures are arranged not only so as to scatter the light beam injected into the optical fiber, but also to reflect it. In practice, the reflection phenomenon is obtained by arranging the microstructures periodically along the longitudinal axis of the optical fiber. In this alternative embodiment, the microstructures are formed in the core of the optical fiber or at the interface between the core and the cladding of the optical fiber.

According to a specific embodiment, according to the first alternative embodiment, each microstructure has a spherical shape. A Bragg grating is then presented in the form of a periodic chain of microbubbles. The microbubbles have for example a diameter between $\lambda/10$ and $10\lambda$, where $\lambda$ denotes the wavelength of the light beam or the central wavelength of the spectrum of the light beam.

The microstructures can come in other shapes, for example an ellipsoid or a revolving ellipsoid. A not perfectly spherical shape can particularly be useful for scattering the light beam in an anisotropic manner.

The microstructures can also be presented in the form of corrugations at the interface between the core and the cladding of the optical fiber.

According to a second alternative embodiment of the invention, at least one set of patterns is inscribed in the optical fiber, the patterns of each set being arranged to form a Bragg grating, the microstructures being separate from the patterns of the Bragg grating. In other words, in this alternative embodiment, the optical fiber comprises, on one hand, microstructures generating a scattering phenomenon and, on the other, patterns generating a reflection phenomenon.

According to a specific embodiment, each set of microstructures is positioned in the vicinity of a Bragg grating. Thus, the scattering of a portion of the light beam takes place in the vicinity of the Bragg grating, rendering the position therefore along the optical fiber visible.

In the second alternative embodiment, the microstructures can be disposed in the core of the optical fiber, for example upstream and/or downstream from the Bragg grating. Alternatively, the microstructures can be disposed in the optical fiber cladding. They can particularly be disposed in the cladding in the vicinity of the interface between the core and the optical cladding. They can be disposed upstream, downstream and/or parallel with respect to the Bragg grating. Disposing microstructures in the optical fiber cladding is suitable when the scattering and reflection phenomena take place in separate wavelength ranges. A light beam having a wavelength range located outside the optical fiber guiding wavelength range can then be propagated in the cladding and be scattered by the microstructures. Disposing the microstructures in the optical fiber cladding has the advantage of not impacting the propagation of the light beam in the usable wavelength range of the Bragg grating.

The invention also relates to a Bragg grating optical fiber sensor comprising an optical fiber wherein at least one set of patterns forming a Bragg grating is inscribed. According to the invention, the optical fiber further includes a set of microstructures in the vicinity of each Bragg grating, the microstructures being separate from the patterns forming the Bragg grating, each microstructure being capable of scattering a portion of a light beam in a predetermined scattering wavelength range.

According to a specific embodiment, the optical fiber includes a core and an optical cladding and the microstructures are disposed in the optical cladding. Advantageously, the microstructures are disposed in the vicinity of the core, i.e., closer to the inner peripheral surface of the optical cladding than to the outer peripheral surface of the optical cladding.

The microstructures could also be disposed in the core of the optical fiber or at the interface between the core and the optical cladding.

The microstructures are presented for example in the form of spheres or revolving ellipsoids. They can also be presented in the form of corrugations at the interface between the core and the optical cladding.

According to a first embodiment of the sensor according to the invention, or of the method for locating or installing this sensor according to the invention, each Bragg grating is arranged to reflect a light beam in a predetermined Bragg wavelength range, separate from the predetermined scattering wavelength range. In particular, the Bragg wavelength range and the scattering wavelength range can partially overlap or be separated. Thus, the scattering and reflection phenomena take place in different wavelength ranges. In the first alternative embodiment, wherein the microstructures of each set form a Bragg grating, this implies in practice that the microstructures have separate dimensions from the period thereof, also referred to as "pitch". In the second alternative embodiment, wherein the microstructures are separate from the patterns of the Bragg grating, this implies that the microstructures have separate dimensions from the period of the patterns of the Bragg grating.

According to a second embodiment, each Bragg grating is arranged to reflect a light beam in a predetermined Bragg wavelength range, within the predetermined scattering wavelength range. In particular, the two wavelength ranges can be identical.

BRIEF DESCRIPTION OF THE DRAWINGS

Further features, details and advantages of the invention will emerge more clearly on reading the following description, given merely by way of example and with reference to the appended drawings wherein.

DETAILED DESCRIPTION OF SPECIFIC EMBODIMENTS

Figure 1:
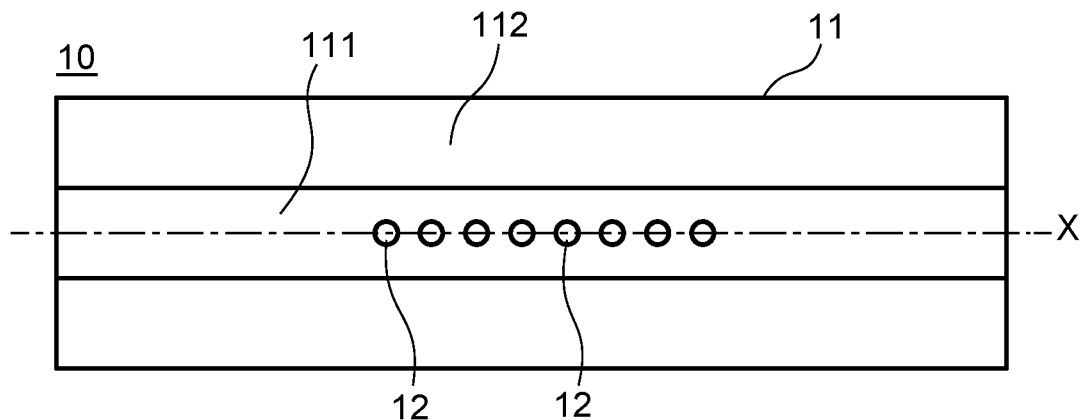
FIG. 1 represents a first example of a Bragg grating optical fiber sensor suitable for use in the implementation of the location or installation method according to the invention.

FIG. 1 represents a first example of a Bragg grating optical fiber sensor suitable for use in the implementation of the location or installation method according to the invention. In this figure, only a segment of the optical fiber is represented. The optical fiber sensor 10 includes an optical fiber 11 comprising a core 111 and an optical cladding 112 surrounding the core 111. The core 111 and the optical cladding 112 extend longitudinally along an axis X. The optical fiber sensor 10 further includes a set of microbubbles 12 formed in the core 111 of the optical fiber 11. The microbubbles 12 are disposed on the longitudinal axis X of the optical fiber 11. They have a different refractive index from that of the core 111 of the optical fiber 11. They are for example optically inscribed by a femtosecond laser. Each microbubble 12 is presented in the form of a sphere wherein the diameter is between 10 nm (nanometers) and 1 mm (millimeter). The diameter can particularly be between 380 nm and 780 nm, so as to correspond to the wavelengths of the visible spectrum, or between 780 nm and 1 mm, so as to correspond to the infrared spectrum. It is for example 400 nm. The microbubbles 12 fulfil a first function of scattering a light beam carried by the optical fiber 11. In other words, they form a scattering structure. The diameter of the spheres must thus correspond substantially to the wavelength of the light beam for which scattering is sought. This wavelength is referred to as the "scattering wavelength". The microbubbles 12 are distributed periodically along the axis X with a pitch between 10 nm and 1 mm. The pitch can particularly be between 380 nm and 780 nm or between 780 nm and 1 mm. It is determined by the distance separating the centers of two adjacent microbubbles 12. In this first example of an embodiment, the microbubbles 12 fulfil a second function of reflecting the light beam carried by the optical fiber. They form patterns of a Bragg grating. The pitch must correspond to the wavelength for which reflection is sought. This wavelength is referred to as the "Bragg wavelength". It should be noted that the Bragg wavelength can differ from the scattering wavelength. The optical fiber 11 can include a plurality of sets of microbubbles 12 distributed along the optical fiber 11 so as to form as many Bragg gratings and scattering structures. The microbubbles can have dimensions and/or pitches which differ according to the set to which they belong. Thus, the scattering and reflection phenomena occur for different wavelengths. Advantageously, the microbubbles have identical dimensions in the different sets but different pitches between the different sets. Thus, the Bragg gratings can be located using a light beam having a single wavelength or a relatively narrow wavelength range. On the other hand, the Bragg gratings respond to the mechanical stress and to the changes in temperature at different wavelengths and thus form individual sensors.

Figure 2:
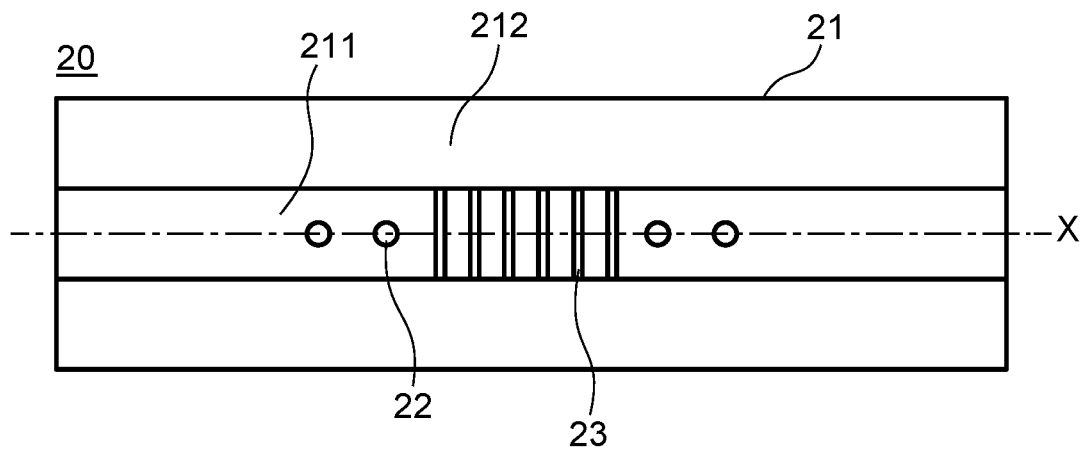
FIG. 2 represents a second example of a Bragg grating optical fiber sensor suitable for use in the implementation of the location or installation method according to the invention.

FIG. 2 represents a first example of a Bragg grating optical fiber sensor according to the invention and a second example of such a sensor suitable for use in the implementation of the location or installation method according to the invention. As for FIG. 1, only a segment of the optical fiber is represented. The optical fiber sensor 20 includes an optical fiber 21 comprising a core 211 and an optical cladding 212 surrounding the core 211, the core 211 and the optical cladding 212 extending longitudinally and concentrically along an axis X. The optical fiber sensor 20 further includes a set of microbubbles 22 and a set of patterns 23 formed in the core 211 of the optical fiber 21. The microbubbles 22 and the patterns 23 have a different refractive index from that of the core 211 of the optical fiber 21. The microbubbles 22 are for example optically inscribed by a femtosecond laser. They are disposed on the longitudinal axis X of the optical fiber 21, on either side of the patterns 23. The diameter of the microbubbles is determined according to the wavelength at which the scattering phenomenon is sought. The patterns 23 have a cylindrical shape wherein the axis corresponds to the axis X of the optical fiber 21. They extend radially over the entire cross-section of the core 211 of the optical fiber 21. The patterns 23 are distributed periodically along the axis X of the optical fiber 21. They thus form a Bragg grating wherein the Bragg wavelength is dependent on the pitch separating the patterns and the refractive index of the core 211. It should be noted that any other pattern could be used instead of cylindrical patterns, once they enable the formation of a Bragg grating. In particular, microbubbles could also be used as patterns for the Bragg grating. In this example of an embodiment, the microbubbles 22 are disposed on either side of the Bragg grating, i.e., upstream and downstream from the Bragg grating. They do not directly indicate the position of the Bragg grating, but they enable the precise location thereof by framing it. In further examples of embodiments, the microbubbles could be disposed only on one side of the Bragg grating.

Figure 3:
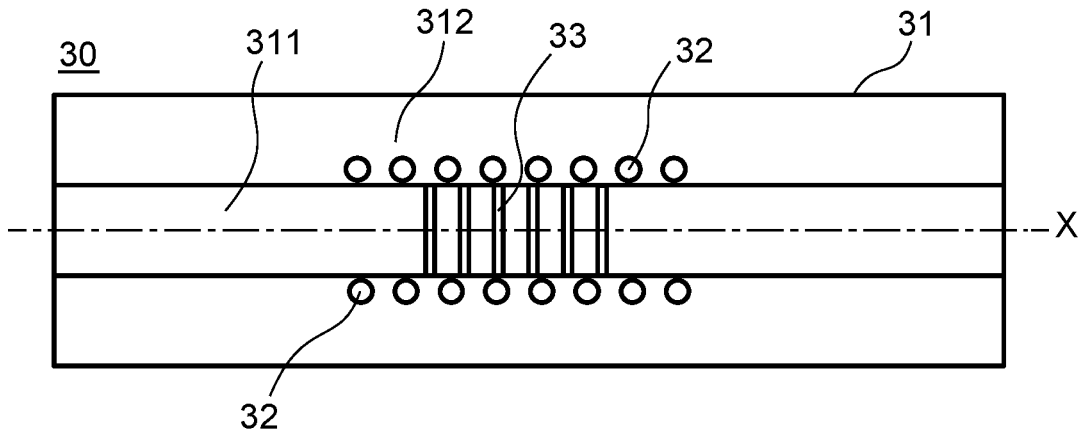
FIG. 3 represents a third example of a Bragg grating optical fiber sensor suitable for use in the implementation of the location or installation method according to the invention.

FIG. 3 represents a second example of a Bragg grating optical fiber sensor according to the invention and a third example of such a sensor suitable for use in the implementation of the location or installation method according to the invention. As for FIGS. 1 and 2, only a segment of the optical fiber is represented. The optical fiber sensor 30 includes an optical fiber 31 comprising a core 311 and an optical cladding 312 surrounding the core 311, the core 311 and the optical cladding 312 extending longitudinally and concentrically along an axis X. The optical fiber sensor 30 further includes a set of microbubbles 32 formed in the optical cladding 312 and a set of patterns 33 formed in the core 311. The microbubbles 32 and the patterns 33 have a different refractive index from that of the core 311. The patterns 33 are identical to the patterns 23 of the optical fiber sensor 20 represented in FIG. 2. The optical fiber sensor 30 differs from the optical fiber sensor 20 of FIG. 2 in that the microbubbles 32 are disposed in the optical cladding 312, in the vicinity of the patterns 33 of the Bragg grating. The microbubbles 32 can be disposed in a single plane passing through the longitudinal axis X of the optical fiber 31 or in several planes passing through the axis X. So as to maximize the scattering phenomenon, the microbubbles 32 are preferably positioned in the vicinity of the interface between the core 311 and the optical cladding 312.

In the different examples of optical fiber sensors described with reference to FIGS. 1 to 3, the scattering structure is always embodied by microbubbles. Nevertheless, any other type of microstructure capable of scattering a light beam at least partially guided in the optical fiber could be used. In particular, the microstructures could have an ellipsoid shape. Moreover, the optical fiber could include a protective coating surrounding the optical cladding. This protective coating can potentially allow the scattered light beam to partially pass through.

Figure 4:
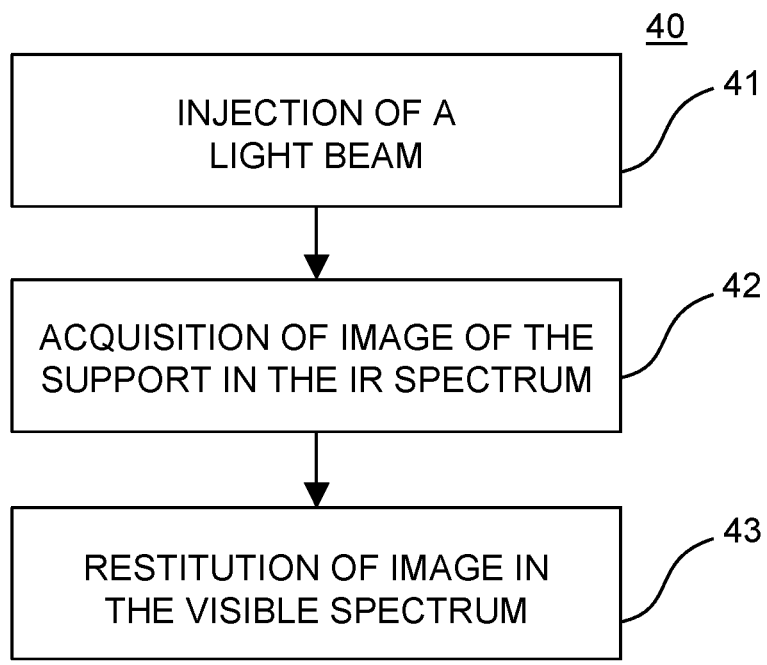
FIG. 4 represents an example of a method for locating a Bragg grating optical fiber sensor according to the invention.

FIG. 4 represents an example of steps of a method for locating a Bragg grating optical fiber sensor according to the invention. In this example, the optical fiber sensor is considered to be inserted into a structure or mounted on a surface of this structure. The Bragg grating optical fiber sensor can particularly be one of the sensors described above. The location method 40 comprises a step 41 of injecting a light beam into the optical fiber of the optical fiber sensor. The light beam has a spectrum determined according to an absorption wavelength range of the material of the structure. In other words, the spectrum is determined such that the local scattering of the light beam causes heating of the structure. The power of the light beam is moreover determined so as to induce a sufficient local temperature variation for the structure. In a step 42, an infrared image of the structure is acquired. In other words, image acquisition of the structure is carried out in the infrared spectrum. This step 42 can be carried out in parallel with the step 41, for example after a predetermined duration, enabling local heating of the structure, or after the step 41. In a step 43, the infrared image is converted into the visible spectrum to enable an operator to locate the hot spots on the image indicating the presence of a scattering structure and therefore of a Bragg grating.

It should be noted that, when the optical fiber sensor is not inserted into a structure but merely disposed on the surface of a structure, the light beam can have a spectrum spread at least partially in the infrared range. Thus, the scattered light beam can be detected directly by the infrared sensor without requiring heating of the structure.

Figure 5:
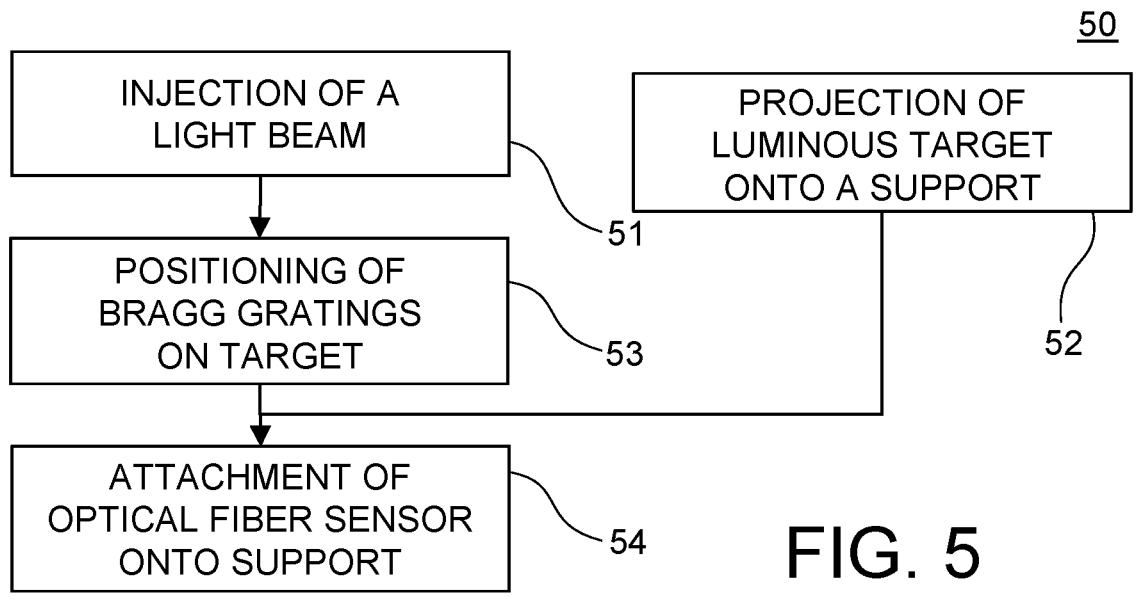
FIG. 5 represents an example of a method for installing a Bragg grating optical fiber sensor according to the invention.

FIG. 5 represents an example of steps of a method for installing a Bragg grating optical fiber sensor according to the invention. The Bragg grating optical fiber sensor can particularly be one of the sensors described above. The installation method 50 comprises a step 51 of injecting a light beam into the optical fiber of the sensor, a step 52 of projecting a luminous target onto a support, a step 53 of positioning the Bragg gratings, and a step 54 of attaching the optical fiber sensor. The light beam injected into the optical fiber preferably includes a range of wavelengths in the visible spectrum. The scattered portion of this light beam can thus be observed directly by an operator. The luminous target includes a set of luminous points each defining a location on the support provided to accommodate a Bragg grating. The step 53 of positioning the Bragg gratings consists of aligning each optical fiber segment scattering the light beam with a luminous point of the target. The step 54 of attaching the optical fiber sensor consists of attaching the optical fiber sensor onto the support so as to secure the Bragg gratings on the desired locations. The optical fiber sensor can particularly be bonded to the support or coated in the support by depositing a layer of material. Preferably, the step 52 of projecting the luminous target is carried out in parallel with the step 51 of injecting the light beam and the step 53 of positioning the Bragg gratings. The step 52 can furthermore be continued during and after the step 54 of attaching the sensor.

Figure 6:
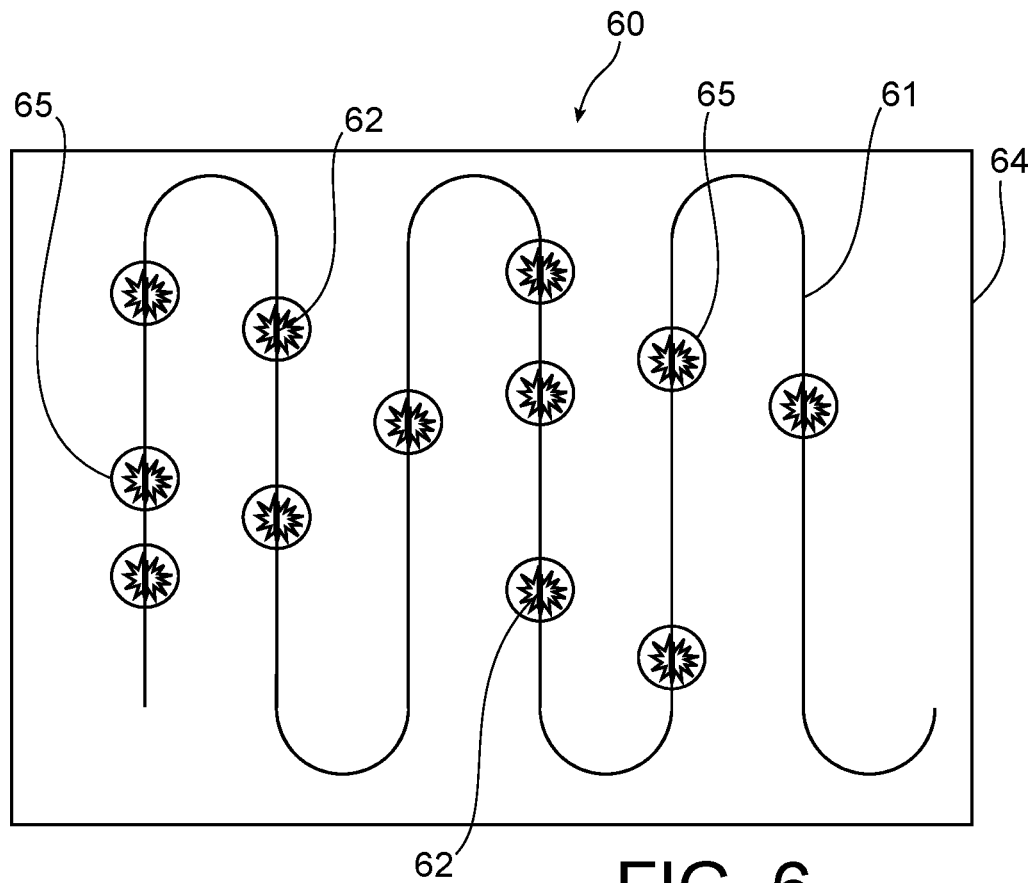
FIG. 6 illustrates the method of FIG. 5.

FIG. 6 illustrates the method for installing a Bragg grating optical fiber sensor on a support according to the invention. The optical fiber sensor 60 includes an optical fiber 61 wherein twelve Bragg gratings individually identifiable by scattering structures 62 are integrated. A light beam is injected into the optical fiber 61 and finds itself partially scattered by each scattering structure 62. A luminous target is projected onto a support 64 so as to form twelve luminous points 65 indicating a desired location for a Bragg grating. The optical fiber 61 is positioned so as to extend by winding on a support 64 by matching the scattering structures 62 with the luminous points 65.

The invention claimed is:

1. A method for locating a Bragg grating optical fiber sensor on a support, the sensor including an optical fiber wherein at least one set of microstructures is inscribed, each microstructure being capable of scattering a portion of a light beam in a predetermined scattering wavelength range, the method comprising:

injecting, into the optical fiber, a light beam wherein a spectrum thereof includes said predetermined scattering wavelength range such that each microstructure scatters a portion of the light beam, the microstructures and the spectrum of the light beam being determined according to an absorption wavelength range of a material of the support; and locating the optical fiber sensor on the support based on the scattered portion of the light beam.

2. The installation method according to claim 1, wherein the microstructures and the spectrum of the light beam are determined such that the microstructures scatter the light beam in a portion of the visible spectrum.

3. The installation method according to claim 1, further comprising acquiring an image of the support in the infrared spectrum.

4. The installation method according to claim 1, wherein the microstructures of each set are arranged so as to form a Bragg grating in the optical fiber.

5. The installation method according to claim 4, wherein each microstructure has a spherical or ellipsoid shape.

6. The installation method according to claim 1, wherein at least one set of patterns is inscribed in the optical fiber, the patterns of each set being arranged to form a Bragg grating, the microstructures being separate from the patterns of the Bragg grating.

7. The installation method according to claim 6, wherein each Bragg grating is arranged to reflect a light beam in a predetermined Bragg wavelength range, separate from the predetermined scattering wavelength range.

8. A method for installing a Bragg grating optical fiber sensor on a support, the sensor including an optical fiber wherein at least one set of microstructures is inscribed, each microstructure being capable of scattering a portion of a light beam in a predetermined scattering wavelength range, the method comprising:

injecting, into the optical fiber, a light beam wherein a spectrum thereof includes said predetermined scattering wavelength range such that each microstructure scatters a portion of the light beam, the microstructures and the spectrum of the light beam being determined according to an absorption wavelength range of a material of the support; and positioning the optical fiber on the support according to the scattered portion of the light beam.

9. The installation method according to claim 8, further comprising projecting a luminous target onto the support, the luminous target indicating each location where a Bragg grating is to be positioned on the support.

10. The installation method according to claim 8, wherein the microstructures and the spectrum of the light beam are determined such that the microstructures scatter the light beam in a portion of the visible spectrum.

11. The installation method according to claim 8, further comprising acquiring an image of the support in the infrared spectrum.

12. The installation method according to claim 8, wherein the microstructures of each set are arranged so as to form a Bragg grating in the optical fiber.

13. The installation method according to claim 12, wherein each microstructure has a spherical or ellipsoid shape.

14. The installation method according to claim 8, wherein at least one set of patterns is inscribed in the optical fiber, the patterns of each set being arranged to form a Bragg grating, the microstructures being separate from the patterns of the Bragg grating.

15. The installation method according to claim 12, wherein each set of microstructures is positioned in the vicinity of a Bragg grating.

16. The installation method according to claim 8, wherein each Bragg grating is arranged to reflect a light beam in a predetermined Bragg wavelength range, separate from the predetermined scattering wavelength range.

* * * * *